(12) United States Patent
Bernstein

(10) Patent No.: US 11,762,829 B2
(45) Date of Patent: *Sep. 19, 2023

(54) SCALABLE FINE GRAINED ACCESS CONTROL WITHIN A SEARCH ENGINE

(71) Applicant: Hyland UK Operations Limited, Maidenhead (GB)

(72) Inventor: Joel Bernstein, New York, NY (US)

(73) Assignee: Hyland UK Operations Limited, Maidenhead (GB)

( * ) Notice: Subject to any disclaimer, the term of this patent is extended or adjusted under 35 U.S.C. 154(b) by 629 days.

This patent is subject to a terminal disclaimer.

(21) Appl. No.: 16/748,649

(22) Filed: Jan. 21, 2020

(65) Prior Publication Data
US 2020/0159713 A1 May 21, 2020

Related U.S. Application Data

(63) Continuation of application No. 15/419,748, filed on Jan. 30, 2017, now Pat. No. 10,540,338.

(51) Int. Cl.
*G06F 16/22* (2019.01)
*G06F 16/21* (2019.01)
*G06F 16/951* (2019.01)

(52) U.S. Cl.
CPC .......... *G06F 16/2272* (2019.01); *G06F 16/21* (2019.01); *G06F 16/951* (2019.01)

(58) Field of Classification Search
CPC ..... G06F 16/2272; G06F 16/21; G06F 16/951
USPC ........................................................ 707/756
See application file for complete search history.

(56) References Cited

U.S. PATENT DOCUMENTS

| 5,864,843 | A | 1/1999 | Carino, Jr. et al. |
| 8,918,388 | B1* | 12/2014 | Chen ...................... G06F 16/283 707/715 |
| 2009/0178144 | A1* | 7/2009 | Redlich ............... G06F 21/6209 726/27 |
| 2010/0250497 | A1* | 9/2010 | Redlich ................. H04L 63/105 707/661 |
| 2011/0106853 | A1* | 5/2011 | Baker .................. G06F 21/6218 707/E17.005 |
| 2011/0246439 | A1 | 10/2011 | Isard et al. |
| 2011/0302194 | A1* | 12/2011 | Gonzalez ................ G06F 16/29 707/769 |
| 2012/0089339 | A1* | 4/2012 | Ganeshalingam ...... G06F 16/22 702/19 |
| 2013/0097430 | A1 | 4/2013 | Mittelstadt et al. |

(Continued)

*Primary Examiner* — Hosain T Alam
*Assistant Examiner* — Nicholas E Allen
(74) *Attorney, Agent, or Firm* — Mintz, Levin, Cohn, Ferris, Glovsky and Popeo, P.C.; F. Jason Far-hadian, Esq.

(57) ABSTRACT

A system and method for providing fine-grained access control in a search engine. Access control predicates associated with a search query, including fixed-width and/or variable-width tokens, are received from the search engine, and are formatted in a machine-readable binary format to generate a single byte array. A pre-sorted memory index structure associated with the single byte array is generated, by sorting the access control predicates according to their token width. The pre-sorted memory index structure is merge joined with an uninverted terms index that includes a sorted list of all terms in a field associated with the search query, and a document index mapping each document identifier (ID) to a term ordinal for a specific field.

20 Claims, 7 Drawing Sheets

(56) References Cited

U.S. PATENT DOCUMENTS

| | | |
|---|---|---|
| 2013/0339311 A1 | 12/2013 | Ferrari et al. |
| 2014/0280159 A1 | 9/2014 | Cao et al. |
| 2014/0344345 A1* | 11/2014 | Venkatraman ...... H04L 61/6009 709/203 |
| 2015/0082399 A1* | 3/2015 | Wu ....................... H04L 9/0891 726/10 |
| 2015/0193636 A1* | 7/2015 | Snelling ................ G06F 16/248 726/28 |
| 2016/0104002 A1* | 4/2016 | Schneider ........... G06F 16/1865 726/4 |
| 2016/0125015 A1* | 5/2016 | Zwilling ............. G06F 16/2365 707/694 |
| 2016/0125189 A1* | 5/2016 | Antonopoulos .... G06F 21/6227 726/30 |
| 2016/0210326 A1 | 7/2016 | Tolman et al. |
| 2017/0344749 A1 | 11/2017 | Yang et al. |
| 2017/0371954 A1 | 12/2017 | Kikuchi et al. |
| 2019/0361897 A1 | 11/2019 | Bernstein et al. |

\* cited by examiner

| Ordinal | Term |
|---|---|
| 0 | aaabbb |
| 1 | cccddd |
| 2 | eeefff |

FIG. 4

| Document Number | Term Ordinal |
|---|---|
| 0 | 2 |
| 1 | 0 |
| 2 | 1 |

FIG. 5

SCALABLE FINE GRAINED ACCESS CONTROL WITHIN A SEARCH ENGINE

CROSS REFERENCE TO RELATED APPLICATIONS

This application is a continuation of U.S. application Ser. No. 15/419,748, filed on Jan. 30, 2017, entitled SCALABLE FINE GRAINED ACCESS CONTROL WITHIN A SEARCH ENGINE, and granted as U.S. Pat. No. 10,540,338 the disclosure of which is incorporated herein by reference.

TECHNICAL FIELD

The subject matter described herein relates to search engines for searching a large document set in a database or data repository, and more particularly to providing fine-grained access control within a search engine.

BACKGROUND

Access control by a search engine is typically performed using an access control list (ACL), which restricts access to documents based on a user role within an enterprise or their identity. Providing fine-grained access control within a search engine is a challenge for many organizations. The actual technical challenge is to filter a large document set based on large a number of access control predicates. A typical approach within a search engine is to build a Boolean query out of the search predicates and create a filter for the main query. The main problem with the Boolean query approach is it that it begins to slow down with a relatively low number of clauses (low tens of thousands). Also, just the act of parsing and building a Boolean query with tens or hundreds of thousands of clauses becomes memory-intensive and slow.

For the sake of discussion, consider the case where each access control predicate is a text token with an average size of 16 bytes. In this scenario a "bag" of 400,000 tokens would be over 6 megabytes (MB) of text. Handling each token as an individual java string would expand this figure considerably. Java will treat each byte as a character, doubling the size to 12 MB of text. Java Strings also carry 32 bytes of overhead per string. Now the original 6 MB of text has expanded to 25 MB. Building Boolean queries from the 400,000 strings continues to pile on more and more object reference overhead. Creating, destroying and manipulating all of this object reference overhead becomes very costly for performance.

What is needed is a way to handle access control predicates, and for providing fine-grained access control within a search engine efficiently and effectively.

SUMMARY

This document describes a system and method to provide fine-grained access control within a search engine.

In one aspect, a method for providing fine-grained access control within a search engine is described. The method includes receiving, by a computer processor from the search engine, one or more access control predicates associated with a search query, the one or more access control predicates including fixed-width and/or variable-width tokens. The method further includes formatting, by the computer processor, the one or more access control predicates in a machine-readable binary format to generate a single byte array. The method further includes generating, by the computer processor, a pre-sorted memory index structure associated with the single byte array, the pre-sorted memory index structure being generated by sorting the one or more access control predicates according to their associated fixed-width and/or variable width tokens.

The method further includes merge joining, by the computer processor, the pre-sorted memory index structure with an uninverted terms index. The uninverted terms index includes a sorted list of all terms in a field associated with the search query, and includes a document index mapping each document identifier (ID) to a term ordinal for a specific field. The merge join identifies document ID matches against the one or more access control predicates. A computer program product and a system are also described, implementing the method described above.

Implementations of the current subject matter can include, but are not limited to, systems and methods, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 shows an example of an uninverted terms index;

FIG. 5 shows an example of a document index;

When practical, similar reference numbers denote similar structures, features, or elements.

DETAILED DESCRIPTION

Figure 1:
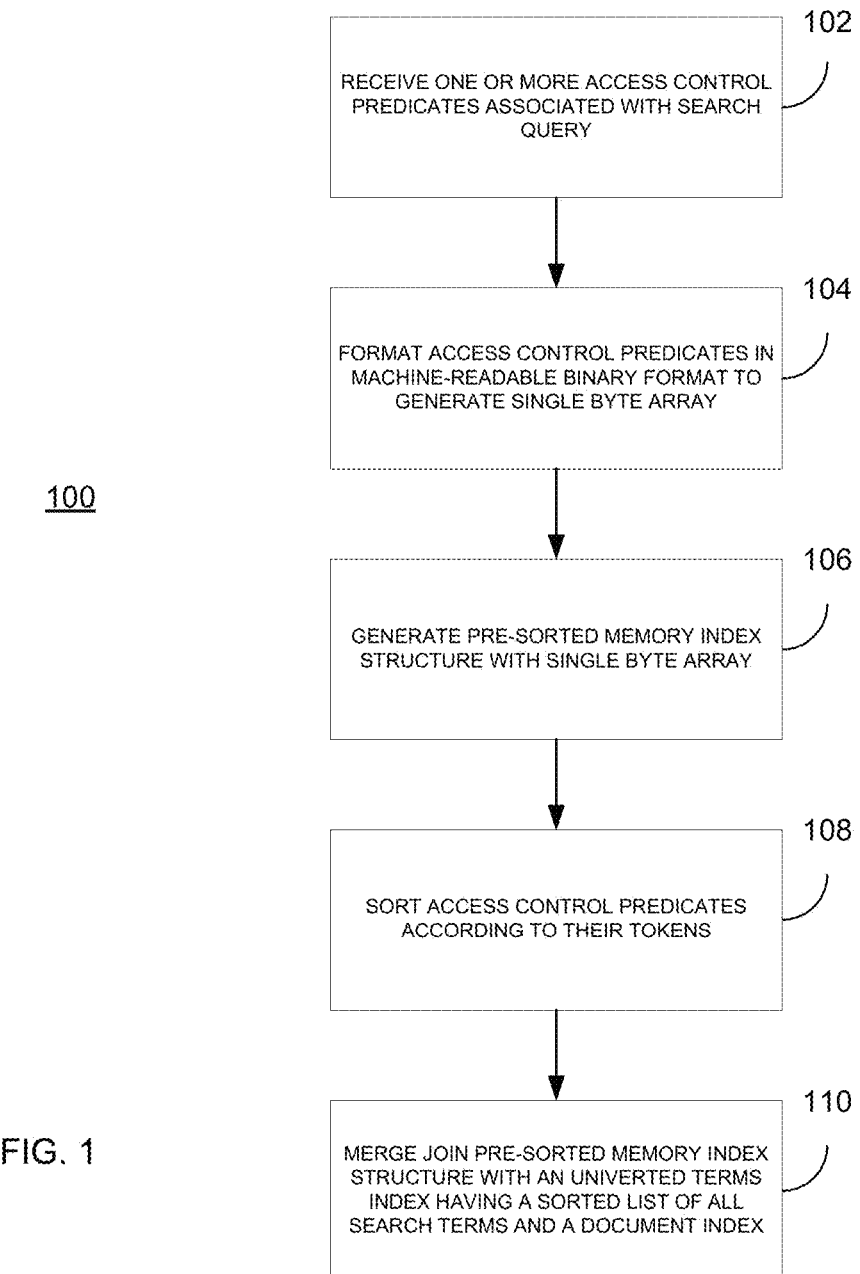
FIG. 1 is a flowchart of a method for providing fine-grained access control in a search engine.

This document describes a system and method for providing scalable, fine-grained access control within a search engine. In exemplary implementations, the system and method are configured for handling the access control predicates as a single array of bytes, instead of as a text token of an individual Java String. Accordingly, the access control predicates can be pre-sorted so that the search engine does not have to change the bytes within the access control byte array. Offsets into the byte array for each predicate are calculated and maintained in a separate integer array. Once the access control predicates and offsets are stored in a pre-sorted memory index structure, the search engine can merge join it with another index structure, such as an uninverted terms index. Then, a two-step join can be executed by the search engine to collect term ordinals, and iterate the document index.

Binary Formatting of the Access Control List

As suggested above, a solution to the problem of access control by a search engine is to treat the access control predicates as a single array of bytes. If the tokens are fixed width, then the tokens can be stored within the byte array without padding and with zero memory over-head. Variable-width tokens can be stored with a single byte header describing the length of the token. To read the individual tokens, a single BytesRef object can be slid along the byte array to provide a pointer to tokens within the array.

Pre-Sorting of the Access Control Predicates

The tokens associated with the Access Control Predicates within the access control list also must be pre-sorted to allow for fast binary searching and merge joining. Sorting of the Access Control Predicates is done ahead of time so that the search engine does not have to change the bytes within the access control byte array. The pre-sorted Access Control Predicates can be formed as a large binary Access Control List (ACL), and sent to the search engine using HTTP multi-part request. To ensure the efficient handling of a large binary access control list (ACL), the ACL can be sent as a stream of bytes. In the case of an HTTP request an HTTP multi-part request can be used to stream the ACL portion of the request. The search engine can then read the binary ACL as a stream of bytes and avoid the overhead involved with String HTTP parameters.

Calculating Offsets

Variable-width Access Control Predicates are stored with a single byte header for the length of each predicate. In order to facilitate binary searching of the Access Control Predicates, the offsets into the byte array for each predicate are calculated and maintained in a separate integer array. This is a very fast operation that can be done at query time by skipping through the length headers in the byte array and by calculating the offset for each token.

Merge Join Rather than Boolean Query

Once the Access Control Predicates are provided in a pre-sorted memory index structure, it can be merge joined with another index structure. In some implementations, a search engine, like Lucene, has two types of index structures: inverted and uninverted. Both structures contain a sorted terms index that could be joined with the Access Control Predicates.

The evolution of the different index structures points towards the uninverted terms index. This is because the uninverted term indexes were designed for very fast repetitive operations, such as facet calculations for example. On the other hand, the inverted index was designed for fast access to a relatively small number of terms. This is one of the reasons that large Boolean queries, which access the inverted index, slow down as they grow to thousands of clauses.

Two Step Join

The uninverted index provides a fast structure with which to merge join, but it does not provide enough information to satisfy the filter criteria of access control for a search query in one step. A two-step join can be used to map the Access Control Predicates to a list of matching documents.

Collect Term Ordinals

In the first step of the join, the Access Control Predicates are intersected with the uninverted Terms Index. The Terms Index is a sorted list of all Terms in a field. During the join, the ordinal number of each intersecting Term is collected in a BitSet. This BitSet provides a very fast data structure for the second stage of the join.

Iterate the Document Index

An uninverted index also contains a Document Index, which is a mapping from a document identifier (ID) to a term ordinal for a specific field. Step two of the join is to iterate through each of the document ID's in the document index and retrieve the term ordinal. Then, each ordinal is tested against the ordinal BitSet collected in Step 1 of the two-step join. If the ordinal is in the BitSet then the document ID matches an Access Control Predicate.

FIG. 1 is a flowchart of a method 100 for providing fine-grained access control in a search engine. At 102, a computer processor receives one or more access control predicates associated with a search query from the search engine. The access control predicates include any number of fixed-width and/or variable-width access control list (ACL) tokens. A fixed-width ACL is an array of bytes, where the first byte indicates a length of each token (N), followed by ACL tokens each of fixed length N, as shown below:

6aaabbbcccdddeeefff . . . .

The example given above has three ACL tokens, {aaabbb, cccddd, eeefff . . . }, each having a fixed length of 6 bytes.

By contrast, a variable-width ACLE is an array of bytes, where each token has a one byte header describing the token length, followed by the token, as shown below:

6aaabbb9cccccdddd6eeefff . . . .

The example given above has three ACL tokens, {aaabbb, cccccdddd, eeefff . . . }, of byte lengths of 6, 9 and 6, respectively.

At 104, the one or more access control predicates are formatted in a machine-readable binary format to generate a single byte array. At 105, the pre-sorted access control list is sent as a multi-part HTTP request, as a stream of bytes to stream the ACL portion of the request. Accordingly, the search engine can read the binary ACL as a stream of bytes and avoid overhead associated with string HTTP parameters.

At 106, a pre-sorted memory index structure associated with the single byte array is generated. The pre-sorted memory index structure is generated by sorting, at 108, the one or more access control predicates according to their associated fixed-width and/or variable width tokens.

Figure 2:
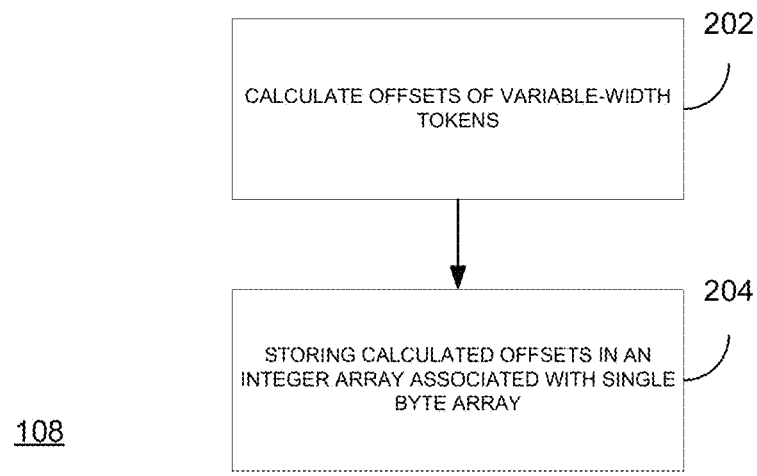
FIG. 2 is a flowchart of a general step to sort access control predicates according to their tokens.

The sorting step (108) is further described in FIG. 2. At 202, offsets of any variable-width tokens of the machine-readable binary-formatted access control are calculated, and at 204, the calculated offsets are stored in a memory by the computer processor in an integer array associated with the single byte array.

Figure 4:
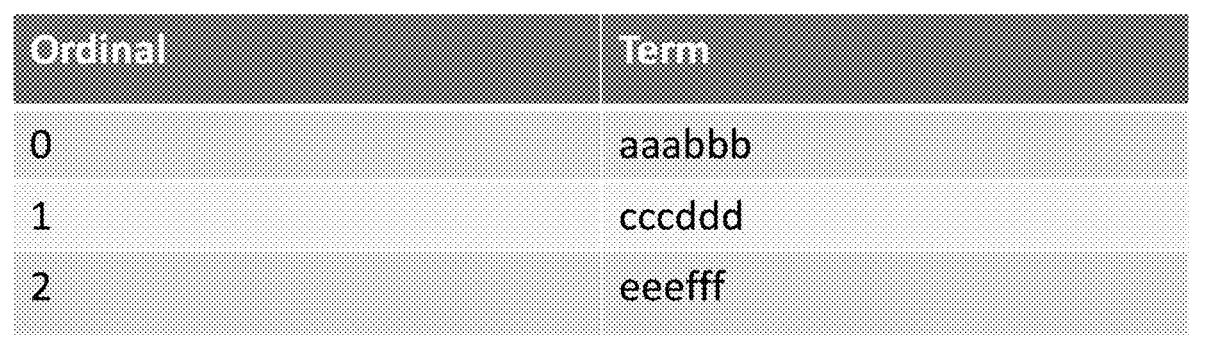
Figure 5:
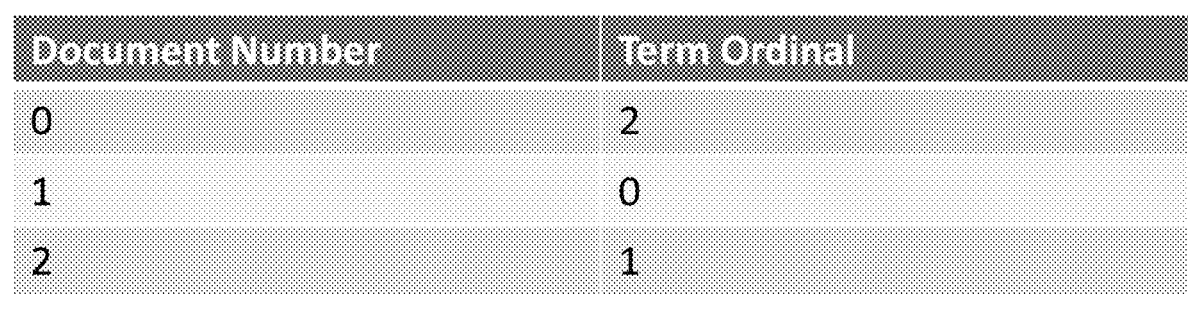

Returning to FIG. 1, at 110, the computer processor merge joins the pre-sorted memory index structure with an uninverted terms index, in a two-step join. The uninverted terms index includes a sorted list of all terms in a field associated with the search query, as shown in the example in FIG. 4. The uninverted terms index further includes a document index mapping each document identifier (ID) to a term ordinal for a specific field, as shown in the example in FIG. 5. The merge joining identifies document ID matches against the one or more access control predicates.

Figure 3:
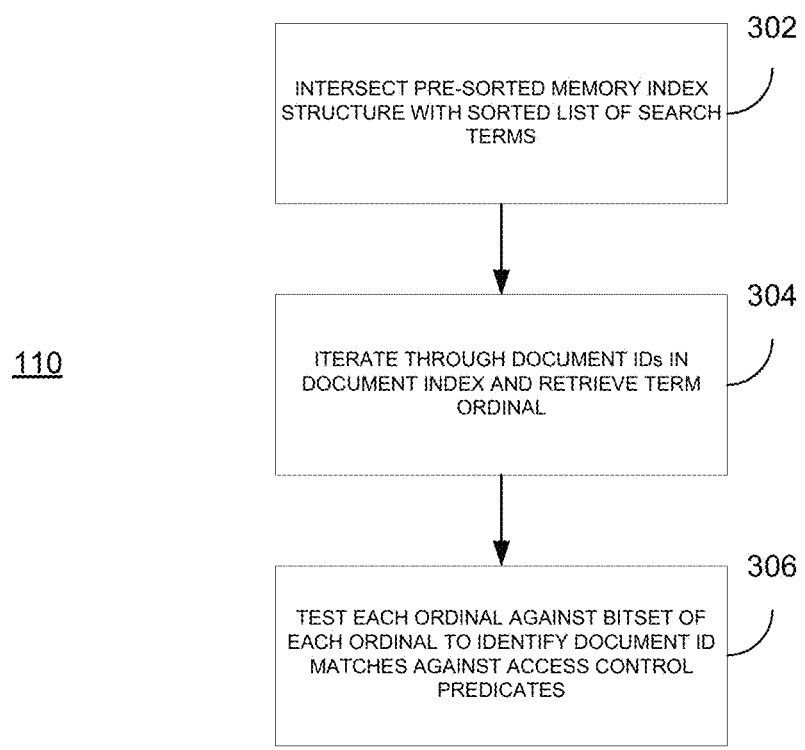
FIG. 3 is a flowchart of a general step to merge join a pre-sorted memory index structure with an uninverted terms index having a sorted list of all search terms and a document index.
Figure 7:
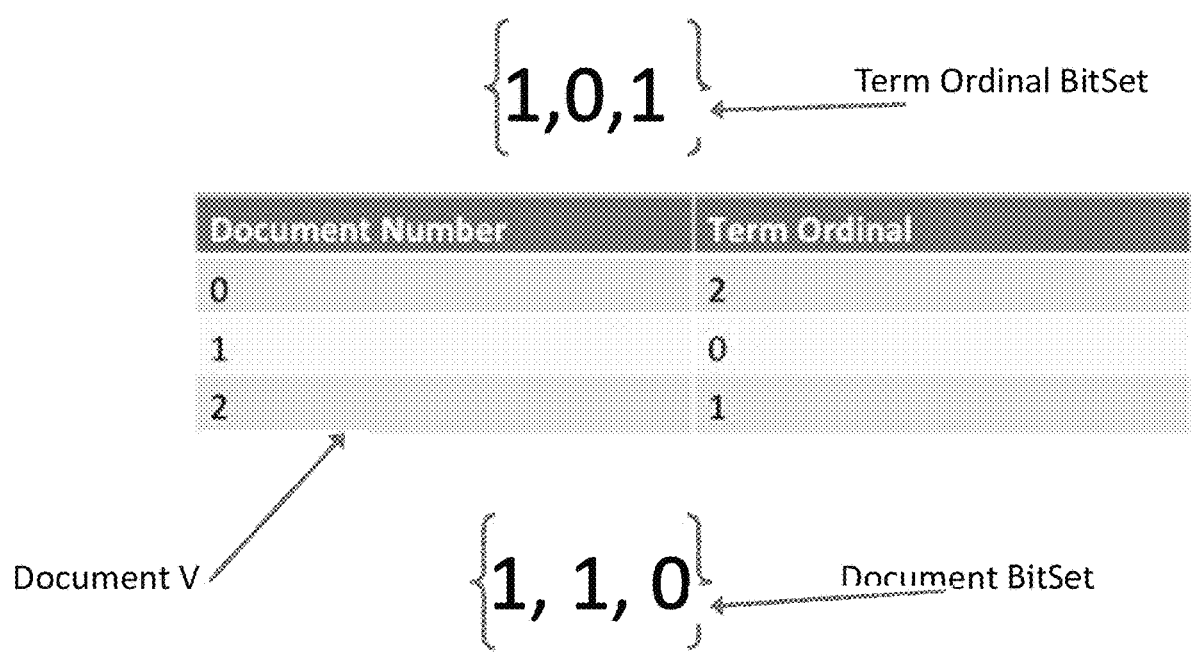
FIG. 7 shows an example of a second step of the merge join, in which the document values index is iterated, and each term ordinal is tested against the term ordinal BitSet.

The two-step join process is shown in the flowchart of FIG. 3. At 302, the pre-sorted memory index structure is intersected with the sorted list of all terms in the field associated with the search query to collect a bitset of each ordinal number of each intersecting term. At 304, the computer processor iterates through each of the document ID's in the document index and retrieves the term ordinal of each term. At 306, each term ordinal is tested against the bitset of each retrieved and collected ordinal to identify the document ID matches against the one or more access control predicates. FIG. 7 shows an example of a second step of the merge join, in which the document values index is iterated, and each term ordinal is tested against the term ordinal BitSet.

Figure 6:
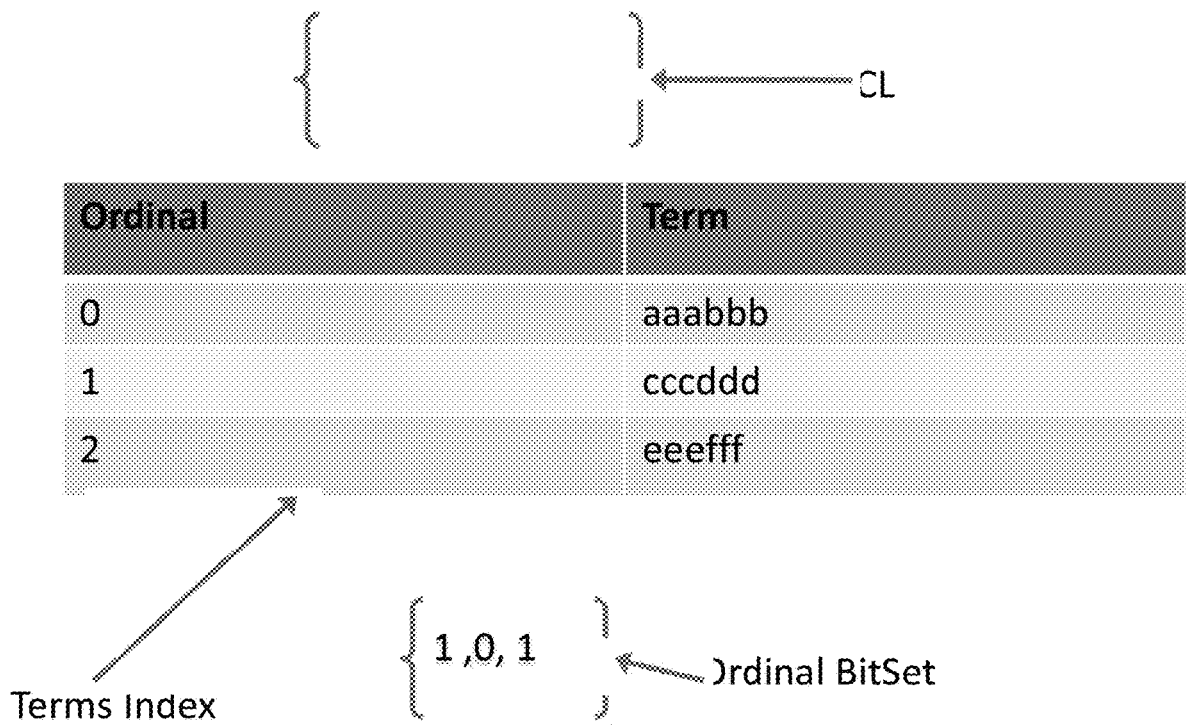
FIG. 6 shows an example of a first step of a merge join of fixed-width access control lists with a terms index, to collect the ordinal of intersecting terms in a BitSet.

In other words, Step 1 of the join includes: merge join the binary ACL with the terms index, then collect the term ordinal for each term that is in the ACL. Term ordinals are collected in a BitSet, for use in Step 2 of the join. FIG. 6 shows an example of a first step of a merge join of fixed-width access control lists with a terms index, to collect the ordinal of intersecting terms in a BitSet because pre-sorted lists are being used, the ACL can be intersected with the terms index quickly. Step 2 of the join includes: iterate the Document Values Index, and then for each document retrieve the term ordinal. Next, test the term ordinal against the BitSet collected in join Step 1; if the term ordinal is in the Bitset, collect the document number in a different BitSet. The document number BitSet is the filter used to filter the main query.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method of providing access control in a search engine, the method comprising:
    receiving one or more access control predicates associated with a search query;
    pre-sorting the one or more access control predicates according to at least one or more of fixed-width and variable-width tokens based on an offset value calculated for a single byte array for at least one access control predicate, the offset value being maintained in an integer array separate from the single byte array;
    formatting the one or more access control predicates in a machine-readable binary format to generate the single byte array;
    generating a pre-sorted memory index structure associated with the single byte array; and
    merge joining the pre-sorted memory index structure with an uninverted terms index, the uninverted terms index having a sorted list of a plurality of search terms associated with the search query, the uninverted terms index further having a document index mapping one or more document identifiers (ID) to a respective term ordinal for a first field, a merge joining identifying document ID to match against the one or more access control predicates.

2. The method in accordance with claim 1, wherein the pre-sorting the one or more access control predicates according to an associated fixed-width or variable width tokens further comprises calculating offsets of any variable-width tokens of the machine-readable binary-formatted access control.

3. The method in accordance with claim 2, wherein the pre-sorting the one or more access control predicates according to the associated fixed-width or variable width tokens further comprises storing the calculated offsets in an integer array associated with the single byte array.

4. The method in accordance with claim 1, wherein the merge joining the pre-sorted memory index structure with an uninverted terms index includes intersecting the pre-sorted memory index structure with the sorted list of one or more terms in the field associated with the search query to collect a bitset of each ordinal number of each intersecting term.

5. The method in accordance with claim 4, wherein the merge joining the pre-sorted memory index structure with an uninverted terms index further includes iterating through one or more of the document ID's in the document index and retrieving the respective term ordinal.

6. The method in accordance with claim 5, wherein the merge joining the pre-sorted memory index structure with an uninverted terms index further includes testing one or more ordinal against the bitset of a collected ordinal to identify the document ID matches against the one or more access control predicates.

7. A non-transitory computer program product storing instructions that, when executed by at least one programmable processor, cause the at least one programmable processor to perform operations comprising:
    receiving one or more access control predicates associated with a search query;
    pre-sorting the one or more access control predicates according to at least one or more of fixed-width and variable-width tokens based on an offset value calculated for a single byte array for at least one access control predicate, the offset value being maintained in an integer array separate from the single byte array;
    formatting the one or more access control predicates in a machine-readable binary format to generate the single byte array;
    generating a pre-sorted memory index structure associated with the single byte array; and
    merge joining the pre-sorted memory index structure with an uninverted terms index, the uninverted terms index having a sorted list of a plurality of search terms associated with the search query, the uninverted terms index further having a document index mapping one or more document identifiers (ID) to a respective term ordinal for a first field, a merge joining identifying document ID to match against the one or more access control predicates.

8. The computer program product in accordance with claim 7, wherein the pre-sorting the one or more access control predicates according to an associated fixed-width or variable width tokens further comprises calculating offsets of any variable-width tokens of the machine-readable binary-formatted access control.

9. The computer program product in accordance with claim 8, wherein the pre-sorting the one or more access control predicates according to the associated fixed-width or variable width tokens further comprises storing the calculated offsets in an integer array associated with the single byte array.

10. The computer program product in accordance with claim 7, wherein the merge joining the pre-sorted memory index structure with an uninverted terms index includes intersecting the pre-sorted memory index structure with the sorted list of one or more terms in the field associated with the search query to collect a bitset of each ordinal number of each intersecting term.

11. The computer program product in accordance with claim 10, wherein the merge joining the pre-sorted memory index structure with an uninverted terms index further includes iterating through one or more of the document ID's in the document index and retrieving the respective term ordinal.

12. The computer program product in accordance with claim 10, wherein merge joining the pre-sorted memory index structure with an uninverted terms index further includes testing one or more ordinal against the bitset of a collected ordinal to identify the document ID matches against the one or more access control predicates.

13. A system for providing fine-grained access control in a search engine, the system comprising:
    at least one programmable processor; and
    a machine-readable medium storing instructions that, when executed by the at least one processor, cause the at least one programmable processor to perform operations comprising:
    receiving one or more access control predicates associated with a search query;
    pre-sorting the one or more access control predicates according to at least one or more of fixed-width and variable-width tokens based on an offset value calculated for a single byte array for at least one access control predicate, the offset value being maintained in an integer array separate from the single byte array;
    formatting the one or more access control predicates in a machine-readable binary format to generate the single byte array;
    generating a pre-sorted memory index structure associated with the single byte array; and
        merge joining the pre-sorted memory index structure with an uninverted terms index, the uninverted terms index having a sorted list of a plurality of search terms associated with the search query, the uninverted terms index further having a document index mapping one or more document identifiers (ID) to a respective term ordinal for a first field, a merge joining identifying document ID to match against the one or more access control predicates.

14. The system in accordance with claim 13, wherein the pre-sorting the one or more access control predicates according to an associated fixed-width or variable width tokens further comprises calculating offsets of any variable-width tokens of the machine-readable binary-formatted access control.

15. The system in accordance with claim 14, wherein the pre-sorting the one or more access control predicates according to the associated fixed-width or variable width tokens further comprises storing the calculated offsets in an integer array associated with the single byte array.

16. The system in accordance with claim 13, wherein the merge joining the pre-sorted memory index structure with an uninverted terms index includes intersecting the pre-sorted memory index structure with the sorted list of one or more terms in the field associated with the search query to collect a bitset of each ordinal number of each intersecting term.

17. The system in accordance with claim 16, wherein merge joining the pre-sorted memory index structure with an uninverted terms index further includes iterating through one or more of the document ID's in the document index and retrieving the respective term ordinal.

18. The system in accordance with claim 17, wherein merge joining the pre-sorted memory index structure with an uninverted terms index further includes testing one or more ordinal against the bitset of a collected ordinal to identify the document ID matches against the one or more access control predicates.

19. The system of claim 13, wherein a fixed-width token is stored in the single byte array without padding to reduce memory overhead.

20. The system of claim 13, wherein a variable-width token is stored in the single byte array with a single byte header describing length of the variable-width token.

* * * * *